(12) United States Patent
Meyer et al.

(10) Patent No.: US 8,069,107 B2
(45) Date of Patent: Nov. 29, 2011

(54) TRANSACTION GATEWAY

(75) Inventors: Keith M. Meyer, Magnolia, TX (US);
Howard D. Thames, Houston, TX (US);
Drew C. Lynch, Katy, TX (US)

(73) Assignee: Cheniere Energy, Inc., Houston, TX (US)

( * ) Notice: Subject to any disclaimer, the term of this patent is extended or adjusted under 35 U.S.C. 154(b) by 423 days.

(21) Appl. No.: 12/081,906

(22) Filed: Apr. 23, 2008

(65) Prior Publication Data

US 2009/0076968 A1   Mar. 19, 2009

Related U.S. Application Data

(60) Provisional application No. 60/907,941, filed on Apr. 23, 2007.

(51) Int. Cl.
*G06Q 40/00* (2006.01)
(52) U.S. Cl. .......................................................... 705/37
(58) Field of Classification Search ....................... 705/37
See application file for complete search history.

(56) References Cited

U.S. PATENT DOCUMENTS

| 7,162,444 | B1* | 1/2007 | Machado et al. | 705/35 |
| 7,212,997 | B1* | 5/2007 | Pine et al. | 705/36 R |
| 2006/0100959 | A1* | 5/2006 | Martin | 705/39 |

* cited by examiner

*Primary Examiner* — Charles Kyle
*Assistant Examiner* — Clifford Madamba
(74) *Attorney, Agent, or Firm* — Michael Ye; Andrews Kurth, LLP

(57) ABSTRACT

A computerized method for online trading of options is disclosed. The method includes the steps of providing an interface screen that shows market data and market data analysis useful to conduct a transaction and allows a user to input various transaction parameters, wherein the market data and market data analysis shown on the interface screen are continuously updated; dynamically receiving selected transaction parameters for an option from the user; calculating an option premium for the option based on the selected transaction parameters and the continuously updated market data; providing the dynamically calculated option premium to the user; receiving an on-line offer for purchasing the option from the user; and presenting the received offer to a seller of the option for acceptance or rejection.

17 Claims, 14 Drawing Sheets

FIG. 4B

CHENIERE LNG GATEWAY - OPTIONAL DELIVERY http://www.lnggateway.com/OptionalDelivery.aspx#

CHENIERE LNG GATEWAY - OPTIONAL DELIVERY

LNG GATEWAY — CHENIERE

OPTIONAL EX-SHIP SALE OF LNG

| MONTH | NYMEX HENRY HUB | ICE NBP | SPREAD | CHANGE IN SPREAD |
|---|---|---|---|---|
| APR 08 | 8.022 | 6.577 | 1.445 | △ |
| MAY 08 | 7.898 | 5.941 | 1.958 | △ |
| JUN 08 | 7.970 | 5.900 | 2.070 | △ |
| JUL 08 | 8.051 | 5.626 | 2.425 | △ |
| AUG 08 | 8.121 | 5.657 | 2.464 | △ |
| SEP 08 | 8.172 | 5.736 | 2.437 | △ |
| OCT 08 | 8.276 | 7.141 | 1.135 | △ |
| NOV 08 | 8.750 | 8.159 | 0.591 | △ |
| DEC 08 | 9.224 | 8.584 | 0.639 | △ |
| JAN 09 | 9.495 | 9.683 | -0.187 | △ |
| FEB 09 | 9.489 | 9.611 | -0.122 | △ |
| MAR 09 | 9.257 | 8.609 | 0.648 | △ |
| APR 09 | 7.768 | 6.777 | 0.992 | △ |
| MAY 09 | 7.645 | 6.526 | 1.119 | △ |
| JUN 09 | 7.716 | 6.452 | 1.264 | △ |
| JUL 09 | 7.792 | 6.401 | 1.391 | △ |
| AUG 09 | 7.852 | 6.447 | 1.405 | △ |
| SEP 09 | 7.903 | 6.501 | 1.403 | △ |

○ ICE  ○ NYMEX   PRICES ARE DELAYED AT LEAST 30 MINUTES (CLICK TO READ PRICE DISCLAIMER)

○ NYMEX HENRY HUB  ○ ICE NBP

— 409

| | NYMEX HENRY HUB | ICE NBP | SPREAD |
|---|---|---|---|
| MONTH SEP 08 | $ 8.172 | $ 5.736 | $ 2.437 |

CARGO SIZE (CM): 125,000
DISCOUNT: $1.00
SPREAD OPTION VALUE: $ 1.684
OFFER %: 55 %
OPTION PREMIUM (USD): $ 0.926
OFFER GOOD THROUGH: 04 MAY 2007    [CONTINUE]

OPTIONAL SALE / MY ACCOUNT / SUPPORT

FIG. 7B

CHENIERE LNG GATEWAY - OPTIONAL DELIVERY
http://www.lnggateway.com/OptionalDelivery.aspx#
FILE EDIT VIEW FAVORITES TOOLS HELP ┊┊ DEVTOOLBAR VIEW DOM DISABLE VIEW OUTLINE VALIDATE IMAGES RESIZE MISC SHOW RULER
CHENIERE LNG GATEWAY - OPTIONAL DELIVERY

LNG GATEWAY FINAL TRANSACTION CONFIRMATION

PUT OPTION BETWEEN THE PARTIES REGARDING LNG IN ACCORDANCE WITH THE TERMS AND PROVISIONS SET FORTH BELOW AND THOSE CONTAINED IN THE AGREEMENT. THE TERMS ARE:

| OPTION PREMIUM PER MMBtu: | $0.926 |
| TOTAL OPTION PREMUIM: | $4,494,000 |
| STRIKE PRICE: | NYMEX - $1.00 |
| MAXIMUM CARGO SIZE (CM): | 215,000 |
| DELIVERY WEEK: | WEEK 38 of 2008 |

CHENIERE MARKETING, INC.  CHENIERE ENERGY, INC.
NAME:                      NAME: SEAN BROOKS
TITLE:                     TITLE: SENIOR GUY
SIGNATURE:                 SIGNATURE: /S/ SEAN BROOKS
DATE:                      DIGITALLY SIGNED ON: SUNDAY, APRIL 22, 2007

BY CLICKING THE FINALIZE TRANSACTION BUTTON YOU ARE SUBMITTING A BINDING OFFER TO PURCHASE A PUT OPTION PURSUANT TO THE ABOVE DESCRIBED TERMS, WHICH MAY BE ACCEPTED BY GRANTOR WITHOUT FURTHER ACTION ON YOUR PART THROUGH THE END OF THE OFFER PERIOD.

[GO BACK]  [PRINT]                                    [FINALIZE TRANSACTION]

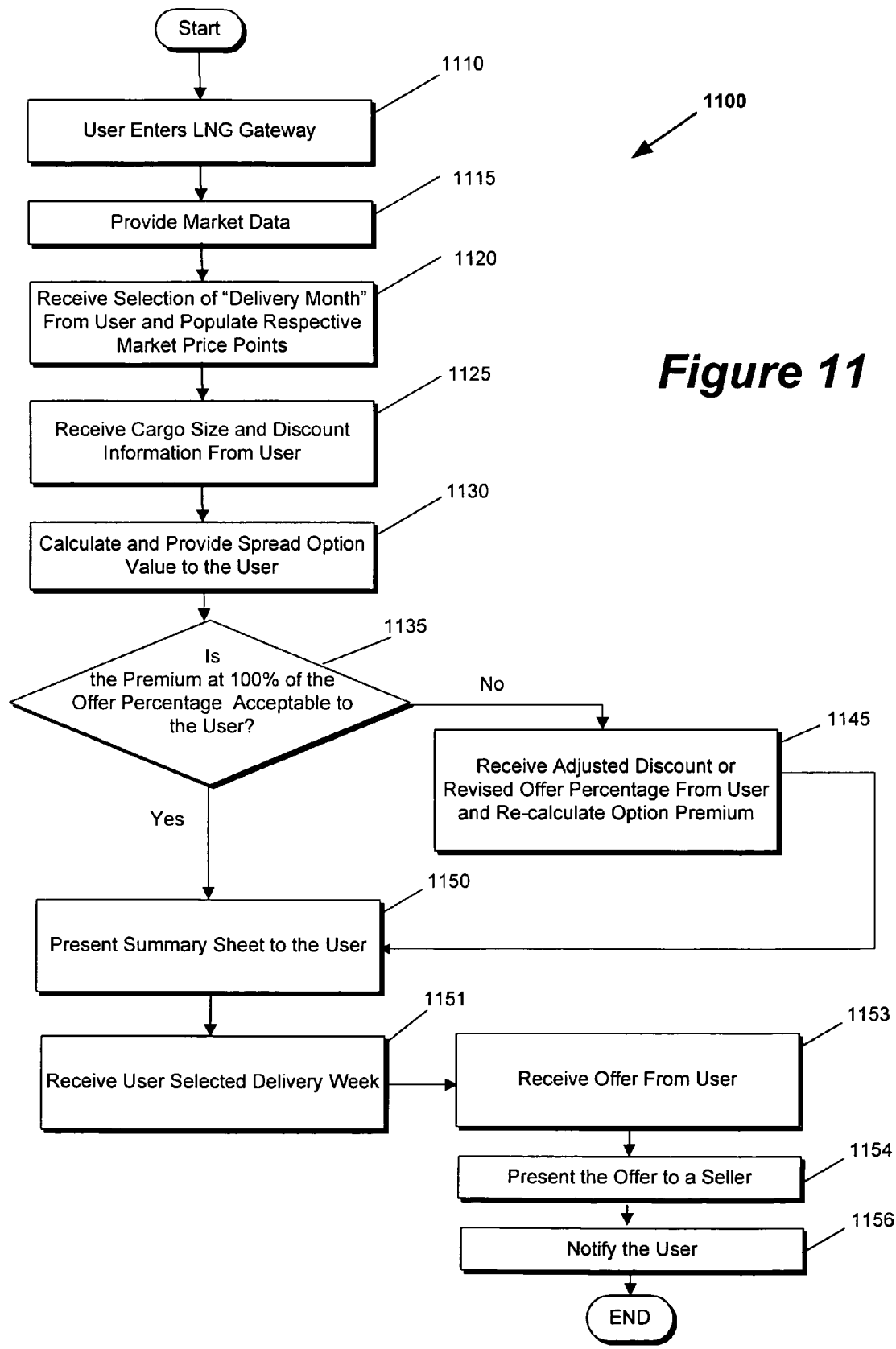

TRANSACTION GATEWAY

CROSS-REFERENCE TO RELATED APPLICATION(S)

This application claims the benefit of provisional application Ser. No. 60/907,941, filed Apr. 23, 2007, entitled "TRANSACTION GATEWAY", the disclosure of which is hereby incorporated by reference in its entirety.

TECHNICAL FIELD

Embodiments described herein generally relate to brokerage systems and methods, and more particularly, to the on-line trading of financial instruments such as options.

BACKGROUND

In recent years, commodity exchanges have become more and more dependent upon electronic trading systems. The older manual methods by which trades were conducted have given way to advanced computer systems that have generally mimicked the manual methods of old. These relatively new electronic trading systems have many advantages over the manual systems, including the ability to provide such features as greater accuracy, reduced labor cost, real time market information, more efficient communications over greater distances, and automated record keeping.

SUMMARY

A computerized method for online trading of options is disclosed. The method includes the steps of providing an interface screen that shows market data and market data analysis useful to conduct a transaction and allows a user to input various transaction parameters, wherein the market data and market data analysis shown on the interface screen are continuously updated; dynamically receiving selected transaction parameters for an option from the user; calculating an option premium for the option based on the selected transaction parameters and the continuously updated market data; providing the dynamically calculated option premium to the user; receiving an on-line offer for purchasing the option from the user; and presenting the received offer to a seller of the option for acceptance or rejection.

Also disclosed is a system for on-line trading of options. The system includes an analyze module that provides continuously updated market information and data analysis to a user; a transaction module that receives transaction parameters from the user, calculates and provides an option premium to the user, receives an on-line offer for purchasing an option from the user; and presents the offer to a seller for acceptance or rejection; and a user interface accessible through a web browser, the user interface shows the market information and data analysis generated by the analyze module and allows a user to input various transaction parameters.

BRIEF DESCRIPTION OF DRAWINGS

FIGS. 4A and 4B are examples of offer generating screens presented by the gateway system.

FIGS. 7A and 7B are examples of a confirmation screen presented by the gateway system.

FIG. 8 is an example of an transaction complete page presented by the gateway system.

FIG. 11 is a flow chart showing the transaction process in accordance with an embodiment of the gateway system of the present invention.

DETAILED DESCRIPTION OF EMBODIMENTS OF THE INVENTION

Figure 1:
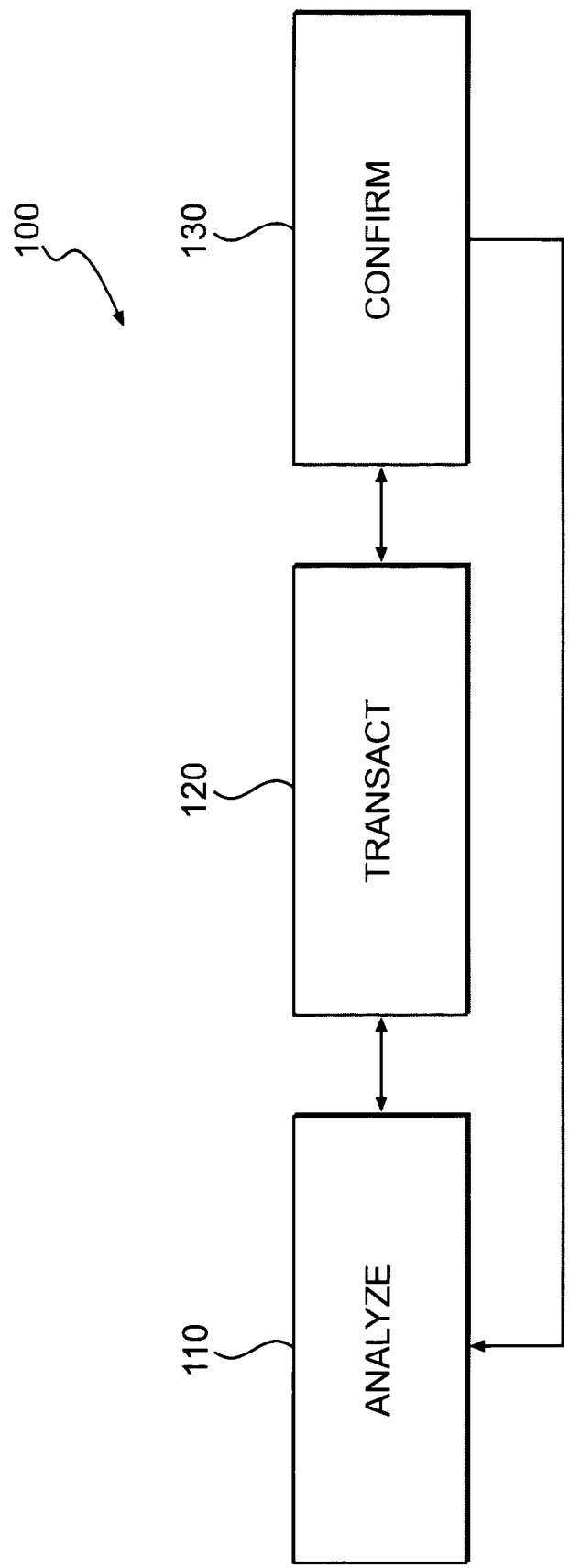
FIG. 1 is a schematic showing modules in an embodiment of the gateway system of the present invention.

A transaction gateway provides access to an online (e.g., Internet based) system that uses interactive market data (e.g., real time data and/or projected data) and analysis tools to facilitate transactions. A user views the market data or other transaction information associated with the goods to be traded (e.g., liquefied natural gas (LNG), natural gas, or other commodities and derivatives) and analyzes the information. Based on the analysis, the user enters certain parameters (e.g., pricing information, quantity information, discount information, option premium information, and/or other information) into the system using the transaction gateway.

As used in embodiments described herein, the terms "market data" and "market information" refer to quote and trade related-data associated with equity, fixed-income, financial derivatives, currency, commodity, and other investment instruments. The terms "market data" and "market information" include numerical price data, reported from trading venues, such as stock exchanges; quote data such as bid, ask, bid size, ask size; trade data such as last sale, last size and volume. The market data and market information refer not only to real time or delayed price quotations, but also includes static or reference data. Reference data may includes identifier codes (e.g. CUSIP), the exchange a security trades on, end-of-day pricing, name and address of the issuing company, the terms of the security (such as interest rate and maturity on a bond), and the outstanding corporate actions (such as pending stock splits or proxy votes) related to the security.

The user then reviews the transaction parameters including the user entered information to confirm that the transaction parameters are correct. The user can change the parameters (e.g., the user entered parameters) prior to finalizing the transaction. If the user is satisfied with the transaction parameters and desires to complete the transaction, the user is presented with a log-in interface screen to verify the identity of the user, which the user can use to enter the system and complete the transaction. The user enters the non-publicly available portion of the system by entering a username and a password. In an embodiment, the user may have already created a username and password and/or may also have executed one or more binding contracts with the provider of the transaction gateway or other party to use the transaction gateway to complete transactions. If the user is new, the user may create a new username and password and/or may execute a binding contract to use the transaction gateway.

In one embodiment, all transactions entered into utilizing the transaction gateway will be entered into by the user with the owner or operator of the transaction gateway serving as the counterparty. For example, if the user purchases an option, the owner or operator of the transaction gateway would be the seller of the option. In another embodiment, transactions will be entered into utilizing the transaction gateway by two or more users without the owner or operator of the transaction gateway being a party thereto. For example, if the user purchases an option, another user of user(s) would be the seller of the option.

All users who actually use the transaction gateway (e.g., with a valid username and password) to enter into transactions must meet certain financial and other criteria before they will be allowed to register and use the transaction gateway. Although all members of the public may view certain portions of the transaction gateway, they will only be able to register and transact thereon if they meet the required criteria.

In accordance with an embodiment, the transaction gateway may be used to trade commodities (e.g., LNG or other commodities), derivatives, or other products. In one embodiment, the transaction gateway is used to trade options.

The term "option" in the context of embodiments described herein is defined broadly as any financial instrument having option-like properties, e.g., any financial derivative including an option or an option-like component. This category of financial instruments may include any type of option or option-like financial instrument, relating to some underlying asset. Assets as used in this application include anything of value; tangible or non-tangible, financial or non-financial. For example, as used herein, options range from a simple "call" or "put" option on a single stock or commodity, and to more complex transactions such as "collar" and "spread".

In one embodiment, the transaction gateway system may be used to make an offer to purchase an option to sell LNG. The transaction gateway system (e.g., LNG gateway) may provide interactive market and/or projected data associated with LNG, and analytical tools that may assist the user in making an offer and/or completing a transaction (e.g., exercising an option to sell). The tool may enable a "sandbox" environment or interface area where members of the public can access, review, and/or update transaction components in order to explore a variety of transaction parameters and/or delivery scenarios. This information as entered or modified by the user in the interface area may be captured and stored by the system. The captured or stored information may be used for future forecasting or projections.

In an embodiment, the system or tool may permit a user to submit a proposal based on a delivery scenario for an optional sale of an LNG cargo at a terminal (e.g., a predetermined LNG regasification terminal and related port or one to be determined in the future). As used herein, a user of the system may be the party who trades LNG and wants to make an offer to purchase an option to sell. Optionally or additionally, the user may be a party who trades options.

Prior to executing a binding offer to purchase an option to sell LNG, for example, the user may be required to obtain a username and password and/or enter into, for example, a binding sales contract and/or other agreement (e.g., a Master LNG Sales Agreement, a Master Cargo Put Option Agreement) with the potential seller of the option. The seller of the option will be the buyer of the LNG if the option to sell is exercised. In one embodiment, the binding agreements must be executed before completion of the transaction. Optionally, the binding agreements are executed simultaneously with the completion of the transaction or after the transaction is completed. All viewers and users of the system, including the purchaser of the option, may be required to agree to the LNG gateway Terms and Conditions of Use that may be presented on the system.

As shown in FIG. 1, the gateway system may include an analyze module 110, a transact module 120 and a confirm module 130. The various modules or components may be provided by appropriate hardware and/or software, including computer-readable media (e.g., a memory, hard-drive, disk, etc.) containing instructions for executing the functions performed by each module. The system providing these modules may reside at a remote server which may be accessible to the user using the Internet or other type of connection. Alternatively, these modules may be distributed among various terminals or devices, including a user terminal.

In an embodiment, the analyze module 110 may provide information for the user to view and analyze data. The information is used by the user to make an offer to purchase an option to sell LNG to a seller of the option, who can accept or reject the offer. The system may provide days, weeks, or months of forecasted data (e.g., forecasted 6, 12, or 18 months into the future) based on, for example, various pricing points, market information and/or future pricing information (e.g., NYMEX Henry Hub, ICE NBP). This forecasted data may be provided to the user so that the user can view the intrinsic value of the option to choose to deliver LNG cargoes in either the U.S. or Europe, for example. The data may be continuously updated throughout the day. The forecasted data may be derived from delayed data or real time data provided by third party data providers using various formulas and calculations. In support of full disclosure, users may be provided with Price Disclaimers and the LNG Gateway Terms and Conditions of Use for important information regarding the sources of the pricing data and any extrapolation performed on the pricing data.

Figure 2:
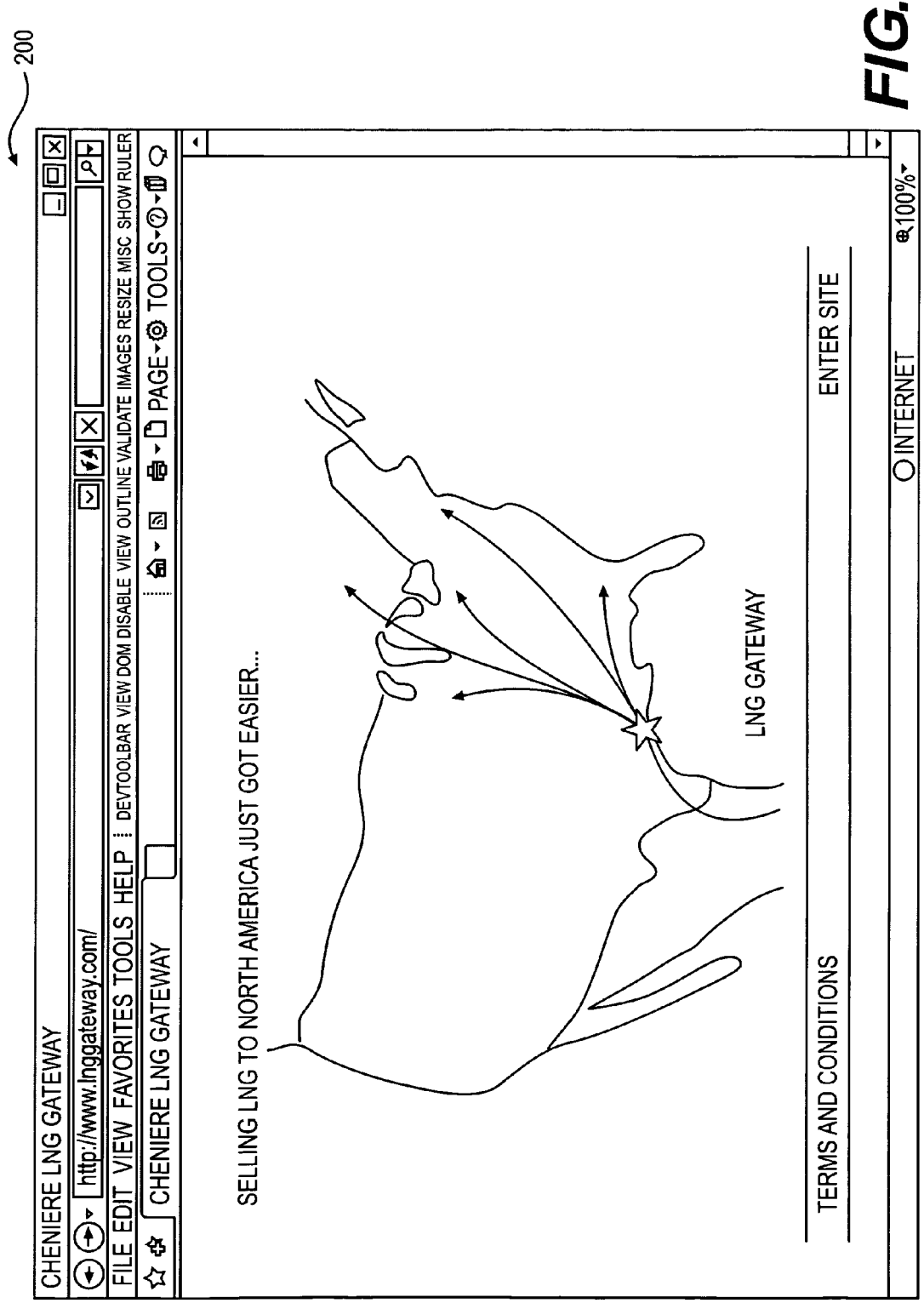
FIG. 2 is an example of an introduction screen presented by the gateway system.

FIG. 2 is an example of an introduction screen 200 that may be presented to users. The introduction screen 200 permits users to enter the transaction gateway by selecting "Enter Site" or view the terms and conditions of use for the transaction gateway by selecting "Terms and Conditions." If the user chooses "Enter Site," then the user will be presented with transaction screens as described below.

Figure 3:
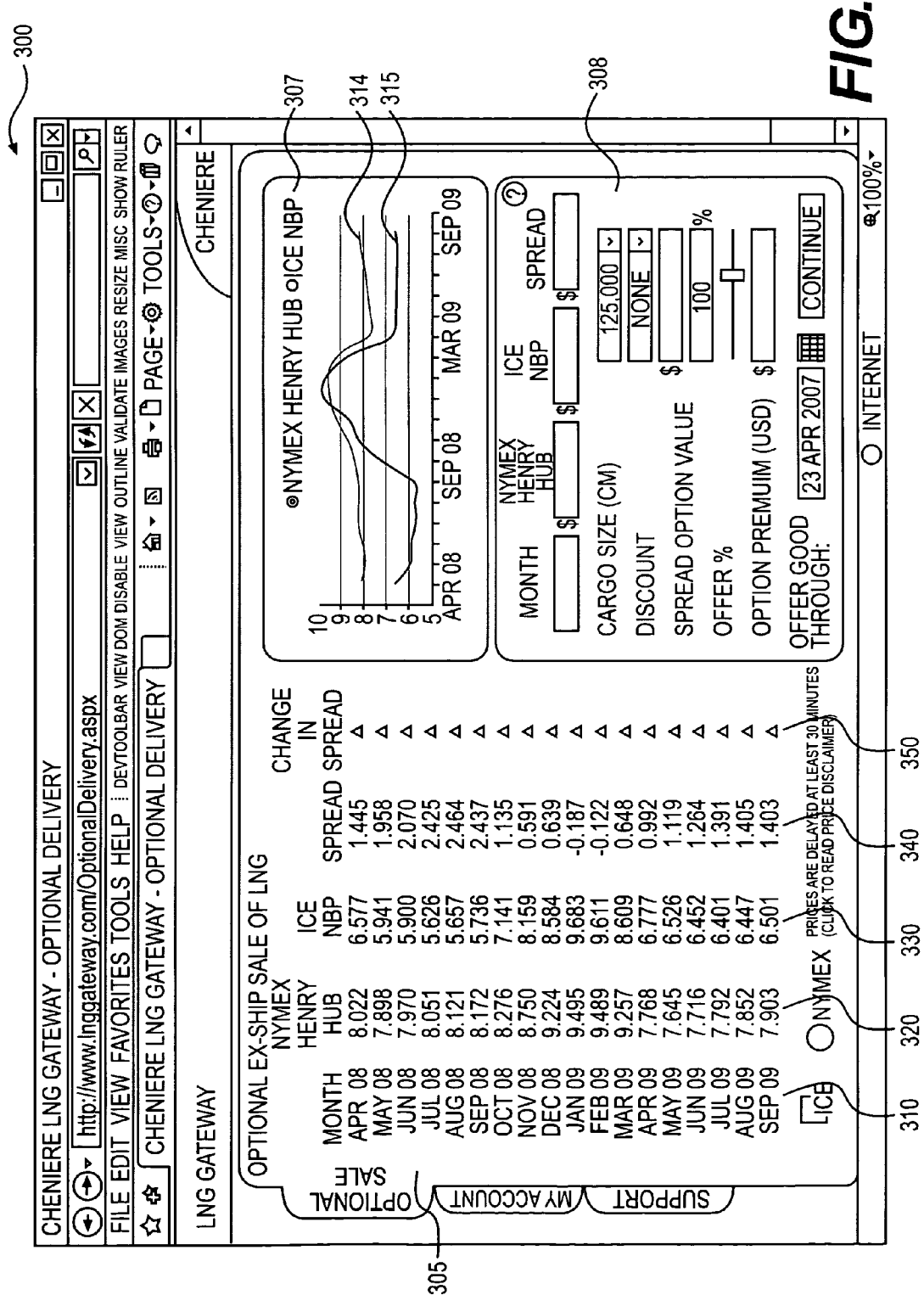
FIG. 3 is an example of an interface screen presented by the gateway system.

FIG. 3 shows an interface screen 300 that may be accessible to the public, without a username and/or password, using the Internet. Optionally, interface 300 may only be accessible through a private network or interface. Interface 300 provides data useful to conduct the transaction and also permits the user to input various transaction parameters to further analyze the transaction before confirming or finalizing the transaction. Interface 300 may be a webpage that includes a data table 305, graph 307, and an input frame 308.

Data table 305 includes a "month" column 310 that represents the contract month or delivery month in which a cargo (e.g., LNG) may be delivered to a delivery point or terminal. The number of future months or weeks that can presented to the user may vary (e.g., 6, 12, or 18 months). The next column 320 is the NYMEX Henry Hub column represented in U.S. Dollars. The NYMEX Henry Hub column represents the prices for natural gas futures contracts in the United States as traded on the futures contract trading exchange owned by, and as published by, the New York Mercantile Exchange, Inc. ("NYMEX") or its affiliates. The prices may be updated on a 30 minutes (or other period) delayed basis compared to the actual NYMEX publication. The NYMEX prices may be further extrapolated to account for the lack of liquidity in the outer months, This column gives the user an indication of the value of natural gas in the United States for a given month.

Column 330 ICE NBP (in U.S. Dollars) in data table 305 represents the prices for natural gas futures contracts in the United Kingdom as traded on the futures contract trading exchange owned by, and as published by, ICE Data LLP or its affiliates ("ICE"), which is also know as the NBP contract, commonly referred to as the national balancing point price in the United Kingdom. The prices in column 330 may be updated on a 30 minutes (or other period) delayed basis compared to the actual ICE publication. The ICE prices are converted by the owner or operator of the system from GBP per therm to US$ per MMBtu and may be further extrapolated to account for the lack of liquidity in the outer months. This column gives the user an indication of the value of natural gas in the United Kingdom for a given month.

Column 340 contains the Spread (e.g., in U.S. Dollars), which is the difference between NYMEX Henry Hub and ICE NBP. In essence, the spread provides the user with a quick view into the potential difference between the price of the LNG in one market (e.g., U.S.) as compared to another market (e.g., Europe) so the user can quickly determine if it is worth the cost to load and ship the LNG to another market for a potential sale and profit. The spread value in column 340 may be color coded to show a positive or negative spread. For example, positive spreads may be displayed in green, while negative spreads are displayed in red. The change in spread values may be represented by directional arrows in column 350, representing a directional change in the spread values when comparing the latest contract closing spread to the current spread. For example, if the spread values in column 340 have increased since the last day's close, a green "up" arrow may be displayed in column 350. If the spread has decreased, a red "down" arrow may be displayed in column 350.

The intrinsic value of the spread may also be displayed in graphical format as shown in FIG. 3, which shows graph 307 including the NYMEX Henry Hub pricing point curve 314 and the ICE NBP pricing point curve 315. The graph 307 may or may not be updated on a real time or delayed time basis. The graph 307 may capture and display the same data as shown in columns 320 and 330.

Referring again to FIG. 1, the transact module 120 may receive transaction data from the analyze module 110 and/or a user, and processes the transaction. In accordance with an embodiment, the gateway system 100 permits a user to make an offer to purchase an option to sell a LNG cargo in the future (e.g., a put option) from a seller of the option. The purchaser of the option to sell the LNG has the right but not the obligation to sell and deliver the LNG to the buyer of the LNG during a specified delivery period. The buyer of the LNG and the seller of the option to sell (or its assignee) will be the same party. Exercising the option may require prior notice to the buyer of the LNG. If the option is not exercised, the purchaser of the option to sell may forfeit any premium or costs incurred in buying the option to sell.

Figure 4A:
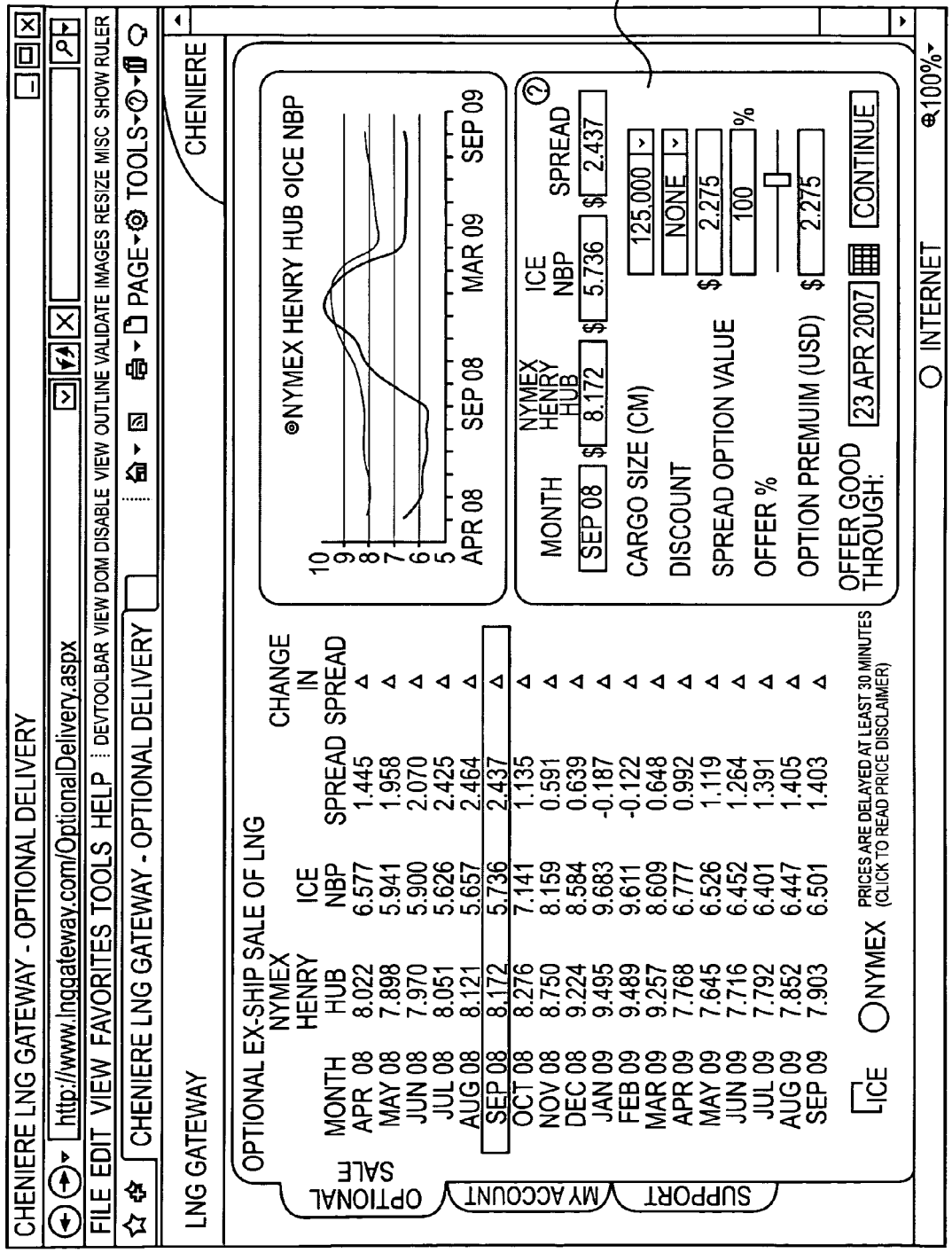

After the user has reviewed and analyzed the data presented in table 305 and graph 307, the user can decide to make an offer to purchase an option to sell LNG from a seller of the option using the input frame 408, as shown in FIG. 4A. Input frame 408 permits the user to enter and view various parameters relating to the transaction. For example, the user selects a delivery month for the LNG. The delivery month represents the month in the future in which the purchaser of the option (or another party) will deliver the LNG. Initially, all deliveries will be at a predetermined delivery point, for example, the Sabine Pass Terminal located in Cameron Parish, La. In another embodiment, the user will be able to select a delivery point. Once the delivery month is selected, NYMEX Henry Hub, ICE NBP and Spread fields will be populated, as shown. As described herein, the NYMEX Henry Hub and ICE NBP data may be based on delayed, as opposed to real time, data, but the data is extrapolated into the future.

The user can select the parameters of the transaction which may include the cargo size of the LNG to be sold, a discount rate the purchaser of the option (e.g., the seller of the LNG) is willing to offer, and the option premium the purchaser of the option is willing to pay. As shown in frame 408, FIG. 4A, the user can select the cargo size (e.g., in 125,000 cubic meters) of the LNG to be sold and delivered. The cargo size is determined from a plurality of predetermined cargo sizes that may be presented in a drop-down menu, from which the appropriate cargo size may be selected by the user. The cargo size may represent the maximum quantity of the LNG cargo that will be the subject of the offer.

Next, the user selects a discount (e.g., from a NYMEX settlement price) that the user is willing to give in order to sell the LNG if the option to sell is exercised. For example, if the user wants the NYMEX settlement price (e.g., on the day of delivery or a different date) a specific day to be the sale price for the LNG, the user will select "none" for the discount. However, if the user desires to offer a discount off of the NYMEX settlement price, the user can enter the discount value manually or select it from a drop down menu. The NYMEX settlement price for the selected day for the selected futures contract minus the discount represents the "strike price" per unit or the per MMBtu sale price for the LNG. For example, if the user selects an October 2008 delivery month and offers a $1.00 per MMBtu discount off of the NYMEX settlement price (e.g., $8.150 per MMBtu), the strike price of the option to sell will be $7.150 per MMBtu.

Based on the transaction parameters selected by the user, the current market data and/or market data analysis, the gateway system (e.g., using a transaction application or program) calculates the spread option value (also refers to as an "option premium") associated with the acquisition of the option to sell the LNG. The spread option value or option premium may be calculated using a variety of variables, calculations and/or mathematical formulas. The discount value may affect the spread option value. For example, a higher discount offered by the purchaser of the option to sell results in a lower cost of option premium (i.e., the cost of the option to sell). However, a higher discount means that a lower price is returned to the seller of the LNG if the option to sell is exercised. If a lower discount is offered by the purchaser of the option to sell, then a higher option premium may be required. However, the lower discount means that a higher price is returned to the seller of the LNG if the option to sell is exercised.

Referring again to FIG. 4A, by using the slide bar in the input frame 408, the user can determine the percentage of the spread option value (e.g., offer %) the user is willing to pay to purchase the option to sell. The default value may be set at 100%. However, by sliding the slide bar to the left or right, the user can increase or decrease the percentage of the spread option value, calculated by the system, the user is willing to pay, as shown by input frame 409 of FIG. 4B. As the slide bar is changed, the option premium field changes accordingly. The spread option value times the offer % (offer percentage) equals the option premium or the "offered premium" for the option. The offered premium will be used to create the "total option premium" that the user will pay to purchase the option to sell or the put option. In an embodiment, the offer % may be greater that 100%. In other words, the user may decide to pay a higher value for the option premium (i.e., higher than the calculated spread option value), if the user so chooses.

A user may enter a "good through" date for the offer to sell, as shown in FIG. 4B. In other words, the good through date represents when the offer will expire. Making an offer to buy a future option to sell is binding on the user or purchaser of the option, subject to acceptance by the seller of the option (e.g., the party who may ultimately purchase the LNG from the seller of the LNG), but the offer will expire on the time indicated in the contract by the date selected by the user (i.e., the offer good through date). The offer good through date may be selected from a drop down calendar, where all weekends and NYMEX holidays may be disabled.

The user can continue to analyze the data presented and the input parameters to determine the desired parameters for the transaction the user is willing to offer for the option to sell. The data can be entered and changed multiple times by the user before the user decides to finalize the transaction and submit the offer. As the data is entered and changed by the user, the changes may be captured by the system, and used for other calculations (e.g., to determine the spread option value). Once the user has finalized the transaction parameters, the user may select the "continue" button in frame 409 to review and confirm an offer to purchase the option to sell LNG.

Figure 5:
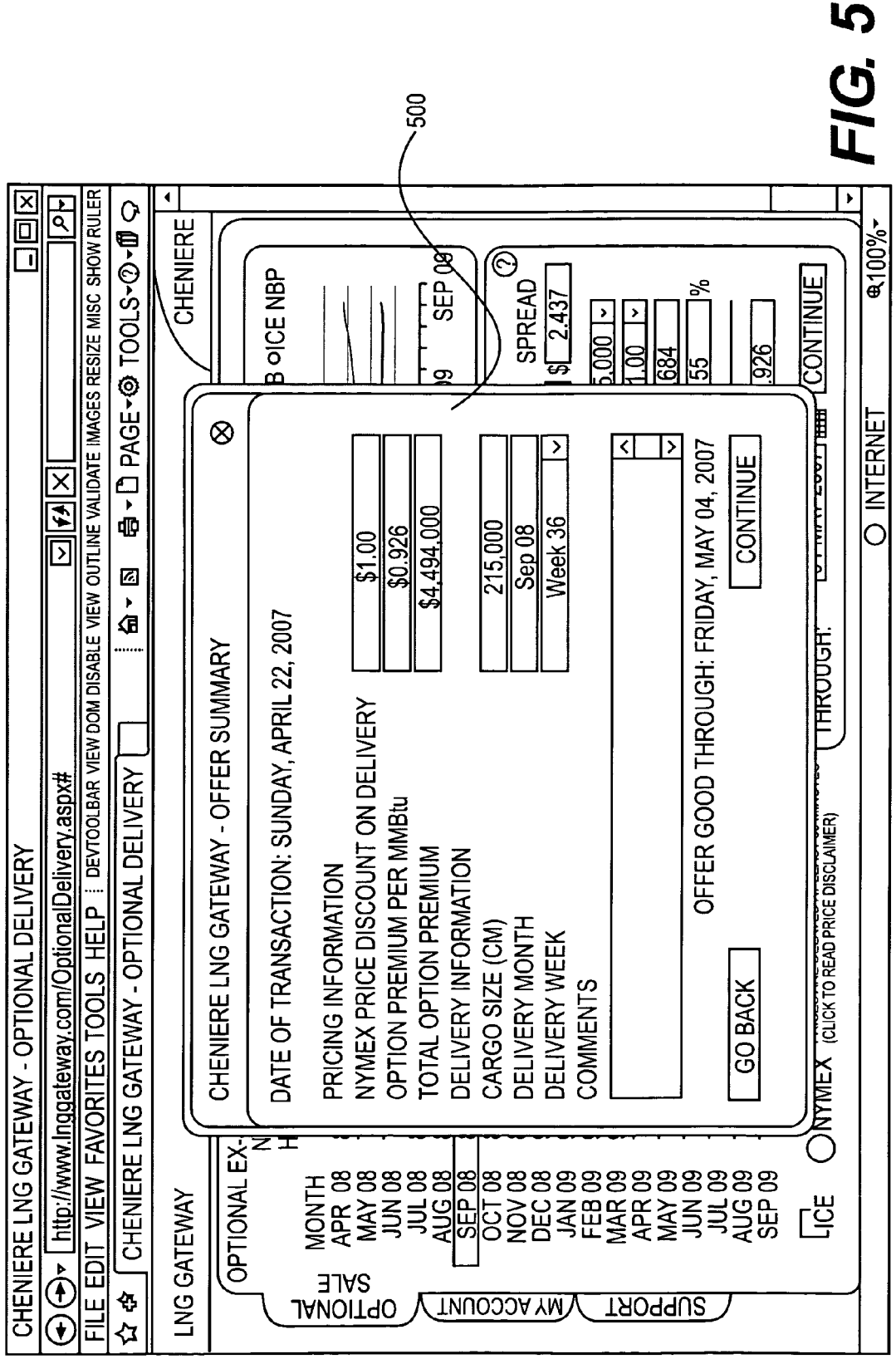
FIG. 5 is an example of an offer summary page presented by the gateway system.

Referring again to FIG. 1, the confirm module 130 is used to confirm and process the transaction based on the input and parameters entered by the user. Once the user desires to confirm the transaction, a offer summary page 500, shown in FIG. 5, is presented to the user. The system provides the offer summary page 500 for the user to review and confirm the selected transaction parameters prior to submitting the offer to purchase an option to sell to the seller of the option. The offer summary page includes the discount, option premium per unit, total option premium, cargo size, and delivery month. To complete the transaction, the user may be required to select an available "Delivery Week." The first Delivery Week of each year may be defined as the first week which includes a Thursday. The user may also have the opportunity to enter comments in the offer summary page 500, as shown. The comments may be entered as free form text and may be attached to any transaction documents generated. The offer good through date may also be listed in the offer summary page 500, as shown.

Figure 6A:
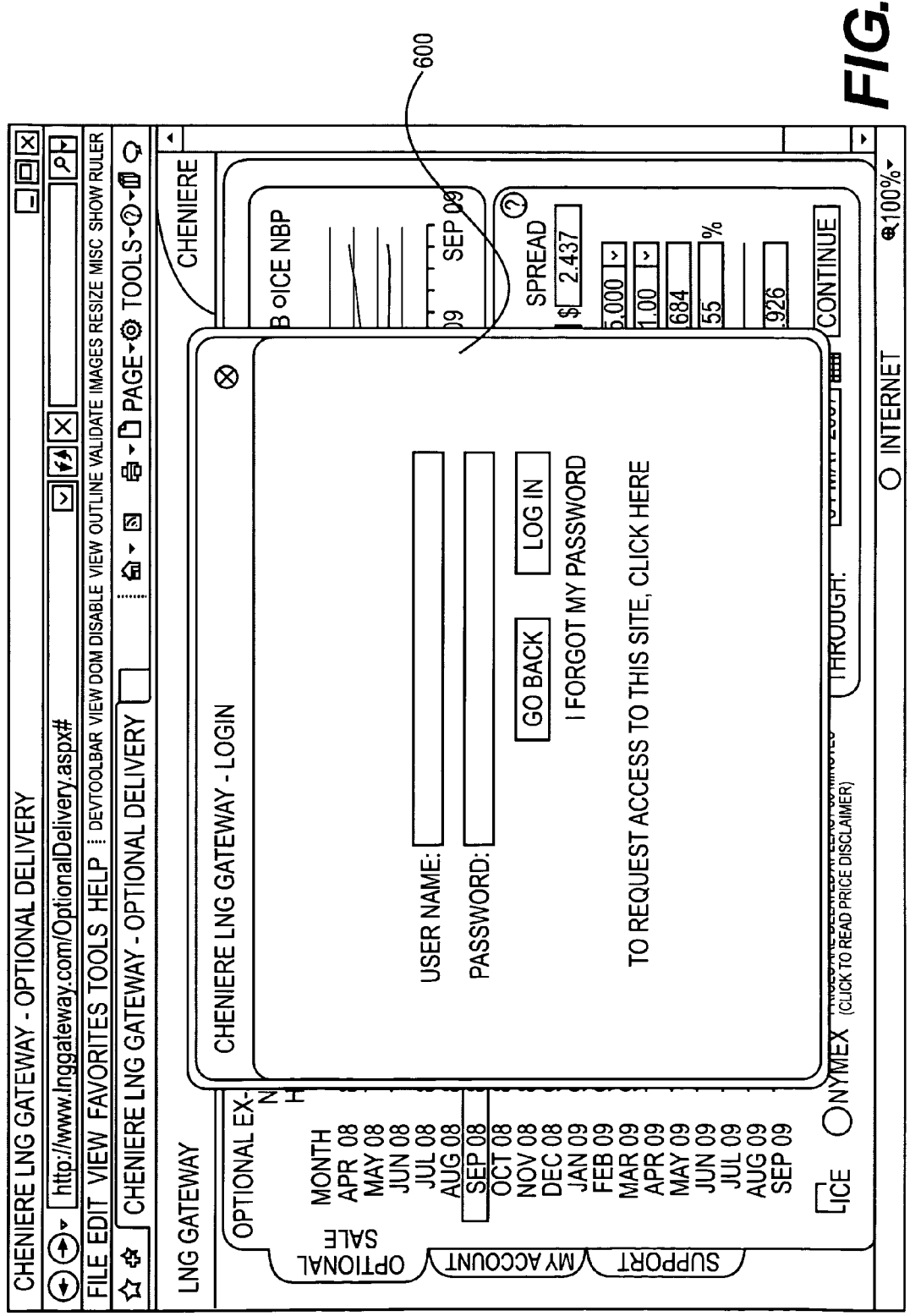
FIGS. 6A and 6B are examples of a login screen presented by the gateway system.
Figure 6B:
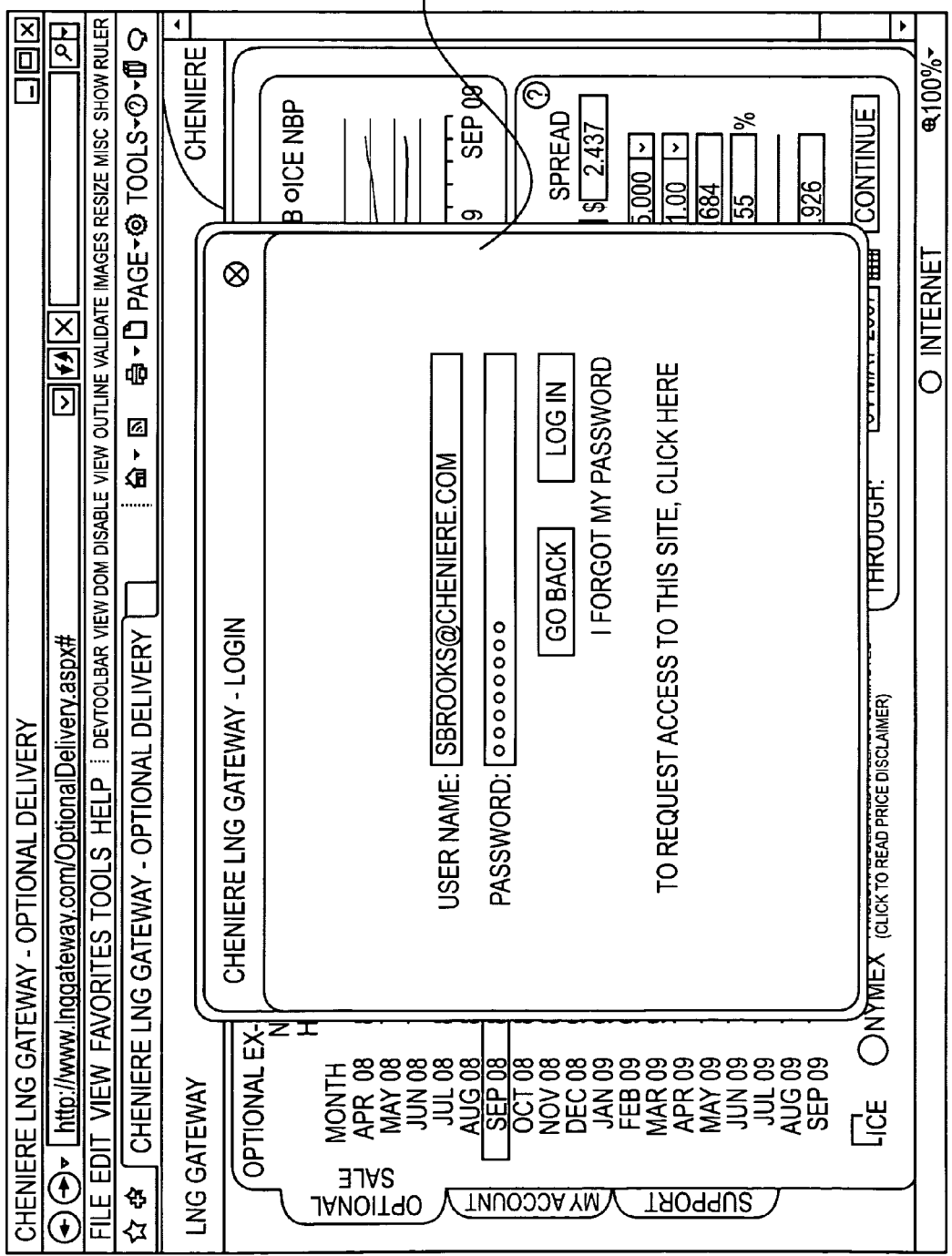

Selecting the "continue" button on the summary page 500, will take the user to the next level of the offer confirmation process, which is a login window 600, shown in FIG. 6A. Prior to completing the transaction, the user may be required to enter a username and password to submit a binding offer. A username and password may only be required when a binding offer is made. A user may receive a username and password after meeting the conditions required by the owner or operator of the transaction gateway. For example, the owner or operator may require execution of one or more agreements by the user before providing a username and password. The agreements may be submitted on-line or by hard copy. In an embodiment, if a username and password have not been obtained, the user cannot submit a binding offer. After the user enters a valid username and password, as shown in FIG. 6B, the user can log into the non-public portion of the system.

Figure 7A:
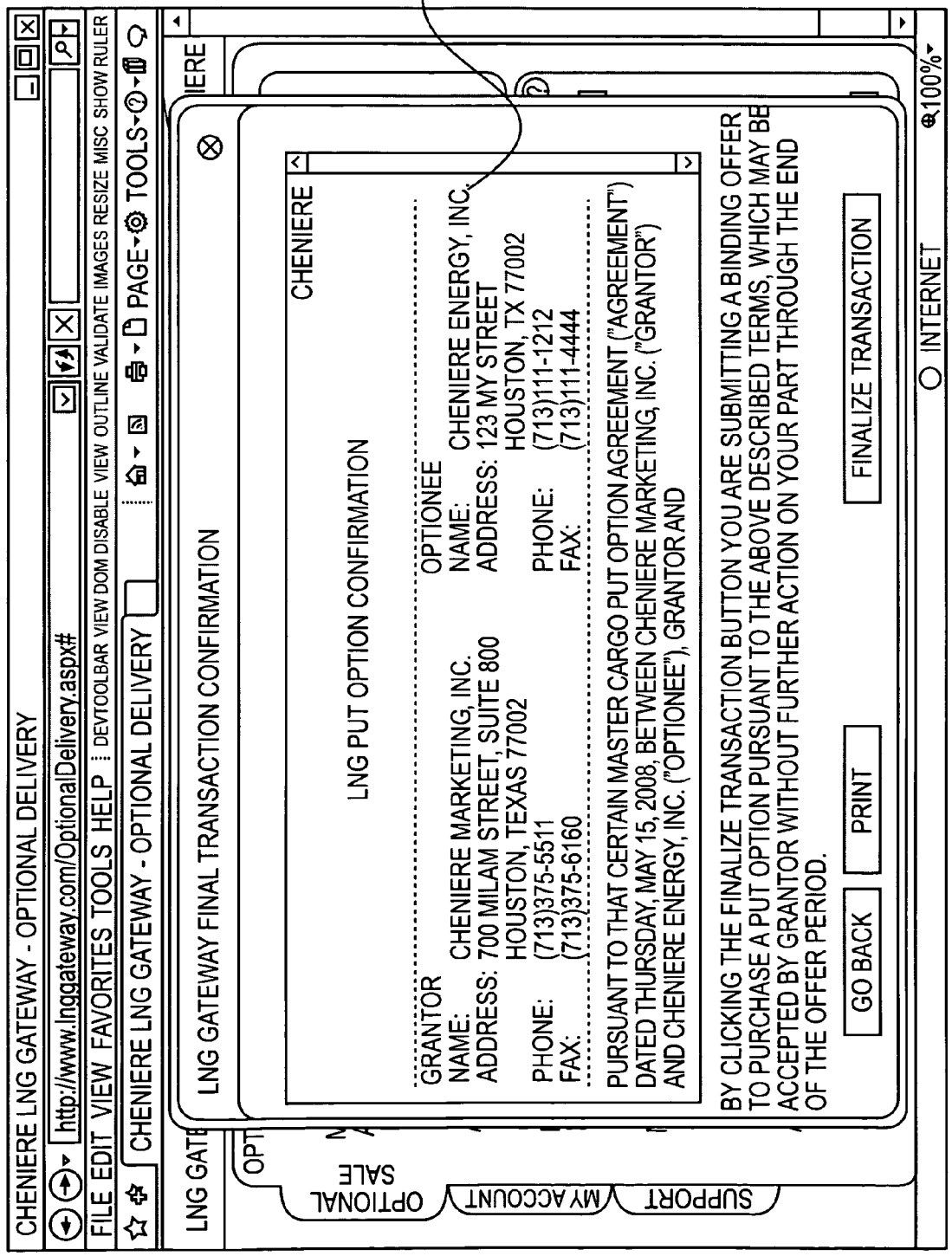

Selecting "Log In" in window 600 invokes the next step in submitting a binding offer; the transaction confirmation screen 700, as shown in FIGS. 7A and 7B. After logging in, the transaction confirmation screen 700 is displayed. The user can print and review the transaction confirmation, and if the user decides to submit a binding offer to purchase an option to sell (e.g., a binding offer to purchase the put option), the user selects the "Finalize Transaction" button in the screen 700.

From the transaction confirmation screen 700, the user may "go back" to the main transaction screen 300. If the user goes back to screen 300, the transaction may be considered canceled. The user can print a copy of the LNG Put Option Confirmation by selecting Print in screen 700.

Figure 8:
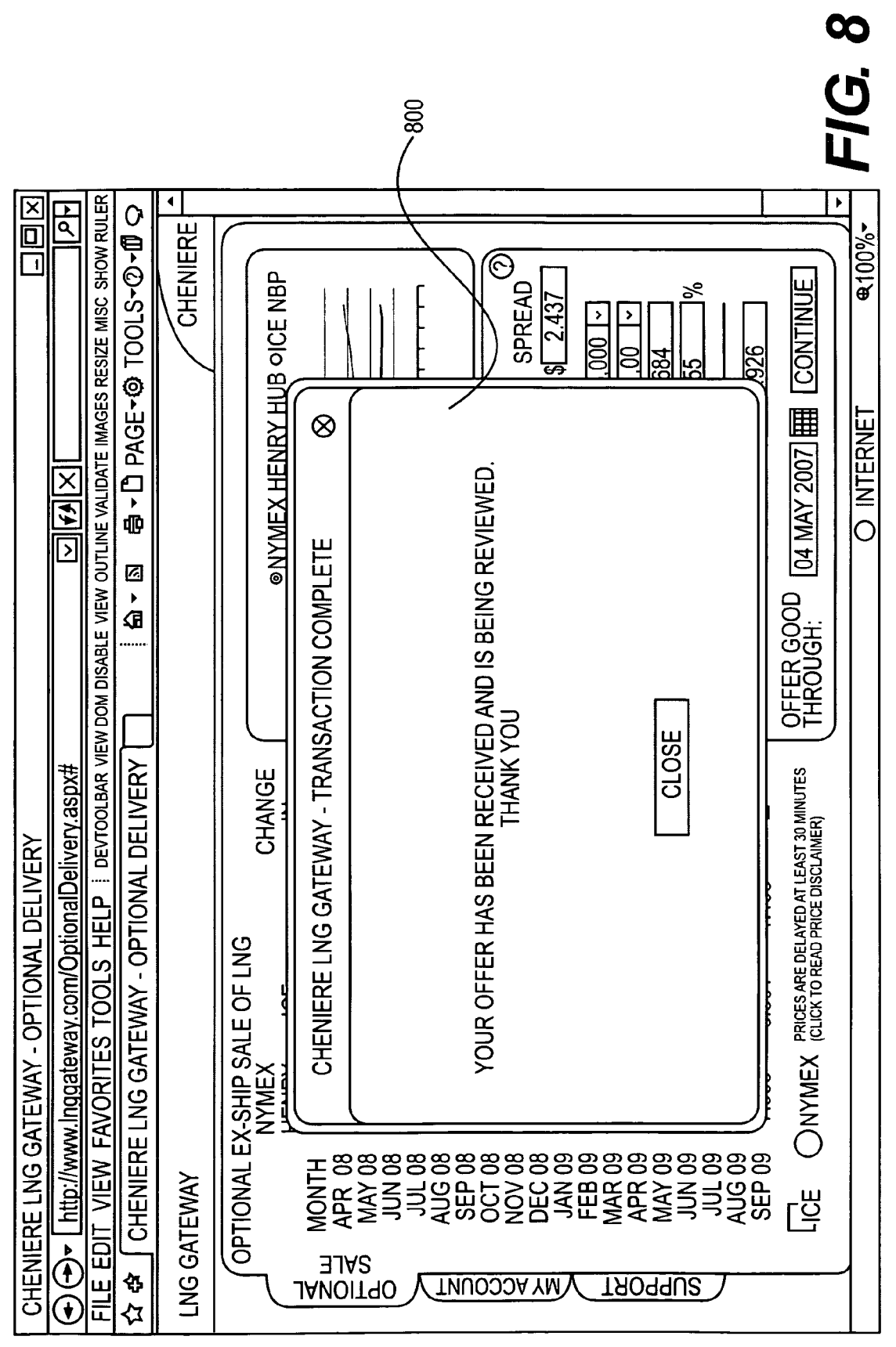

If the user selects the "Finalize Transaction" button in screen 700, the user makes a binding offer to purchase a put option. However, in accordance with an embodiment, by finalizing the transaction, the user has only made a binding "offer" which has to be accepted by the seller of the put option to become final on both parties. The offer to purchase a put option will remain open for the Open Period for acceptance or rejection by the seller of the option. As shown in FIG. 8, a display 800 is presented to the user after the user makes an offer. Such terms of the transaction may be described in a separate agreement (e.g., a Master Cargo Put Option Agreement) that is executed by the user. The terms of the offer to purchase will be reviewed by the seller of the option. If the seller of the option accepts the offer from the user (e.g., as described in the Master Put Option Agreement), then the user and the seller of the option enter into a binding put option transaction. In one embodiment, a confirmation will be sent to the user if the seller of the option accepted the offer to purchase. In another embodiment, the seller of the option will forward a confirmation to the buyer confirming the terms and conditions of the put option transaction. Once the binding transaction is agreed to, the total option premium will become due.

Figure 9:
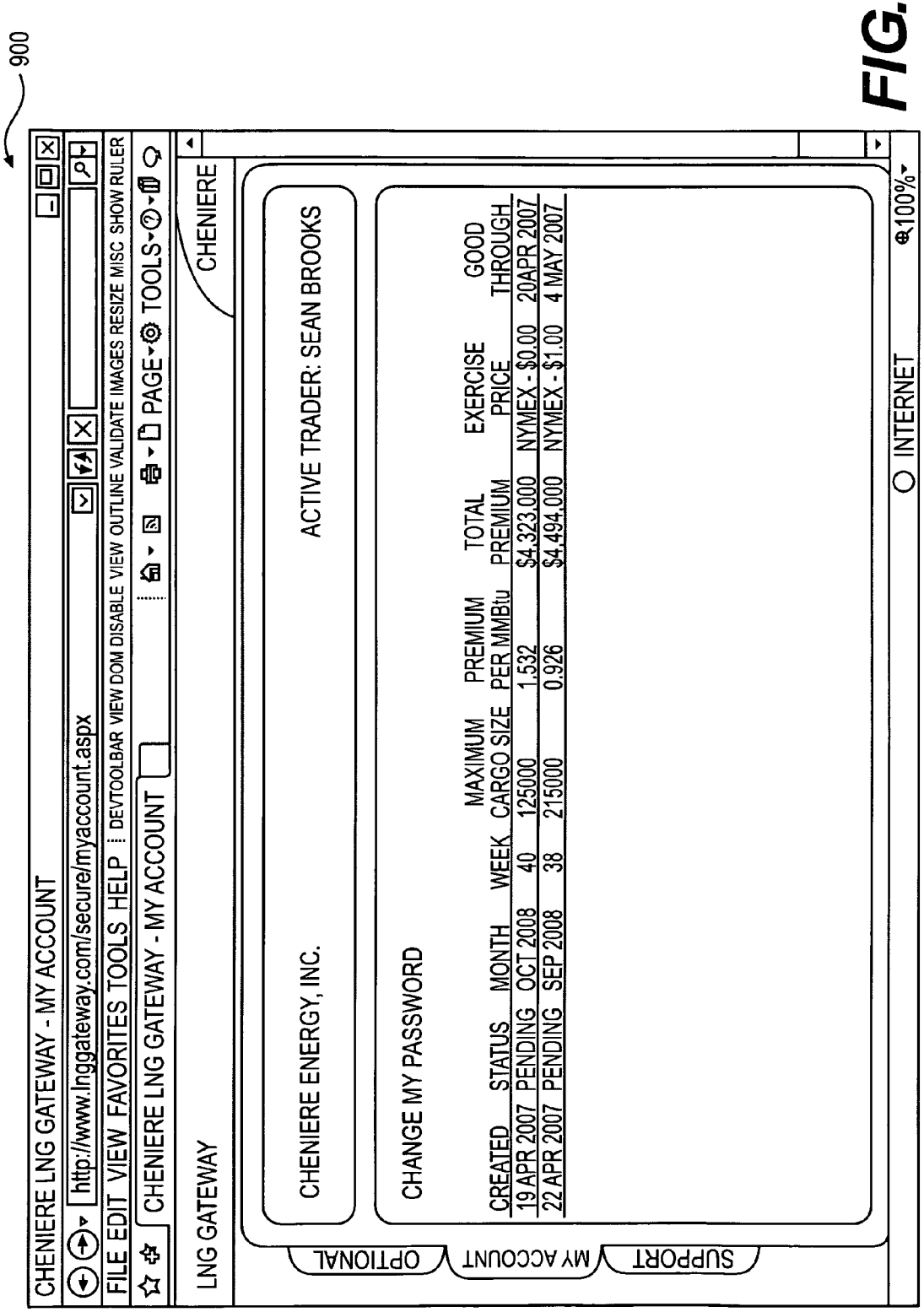
FIG. 9 is an example of a status page presented by the gateway system.

Once a binding transaction is agreed to, the user has the right but not the obligation to sell the cargo to the specified buyer of the cargo on the specified date. However, if the user decides not exercise the option (e.g., not sell the cargo to the specified buyer), the user forfeits the total option premium that was paid for the option. In accordance with an embodiment, an offer for a put option is binding on the offering party (e.g., the user) at the time it is submitted and for some stated duration and will be subject to acceptance or rejection by the seller of the put option. The seller of the option reviews the rationally priced cargoes but is under no obligation to accept the offer. The user may be able to log onto to the system to determine if their offer has been accepted or has lapsed, as shown in screen 900, FIG. 9. If the seller of the option decides not to accept the offer, the offer lapses and the user is under no obligation to deliver the cargo or to pay the total option premium.

The system may be adapted to allow users to enter into transactions involving other commodities and commodity derivatives such as financially settled swaps, options, straddles, and other transactions that do not involve the transfer or ownership of a physical commodity. In an embodiment, the system would act as an exchange where two parties, who do not own or operate the system, enter into transactions utilizing the system.

The transaction gateway may provide global commodity supplies (e.g., LNG or natural gas suppliers) with a significant commercial channel to other markets (e.g., North America). Consequently, suppliers will have easy access to other markets and will not need to arrange for any downstream activities after the delivery of the LNG. A buyer may purchase the LNG cargoes, import them (e.g., into the U.S.), and resell the revaporized gas into a pool of willing demand. In an embodiment, the buyer will purchase the LNG on an ex-ship basis, which means that the seller shall pay all shipping costs to deliver the cargo to the United States. If a FOB cargo is desired, the customer can communicate this to the buyer and pricing adjustments can be made to accommodate the request.

The transaction gateway tool or system is designed to allow users to utilize a publicly accessible easy to use interface to review, evaluate, and make an offer to purchase an option to sell at a delivery point. In addition, the tool will allow customers (who have signed a contract) to actually submit a proposal for reserving a slot for delivery in the future.

Figure 10:
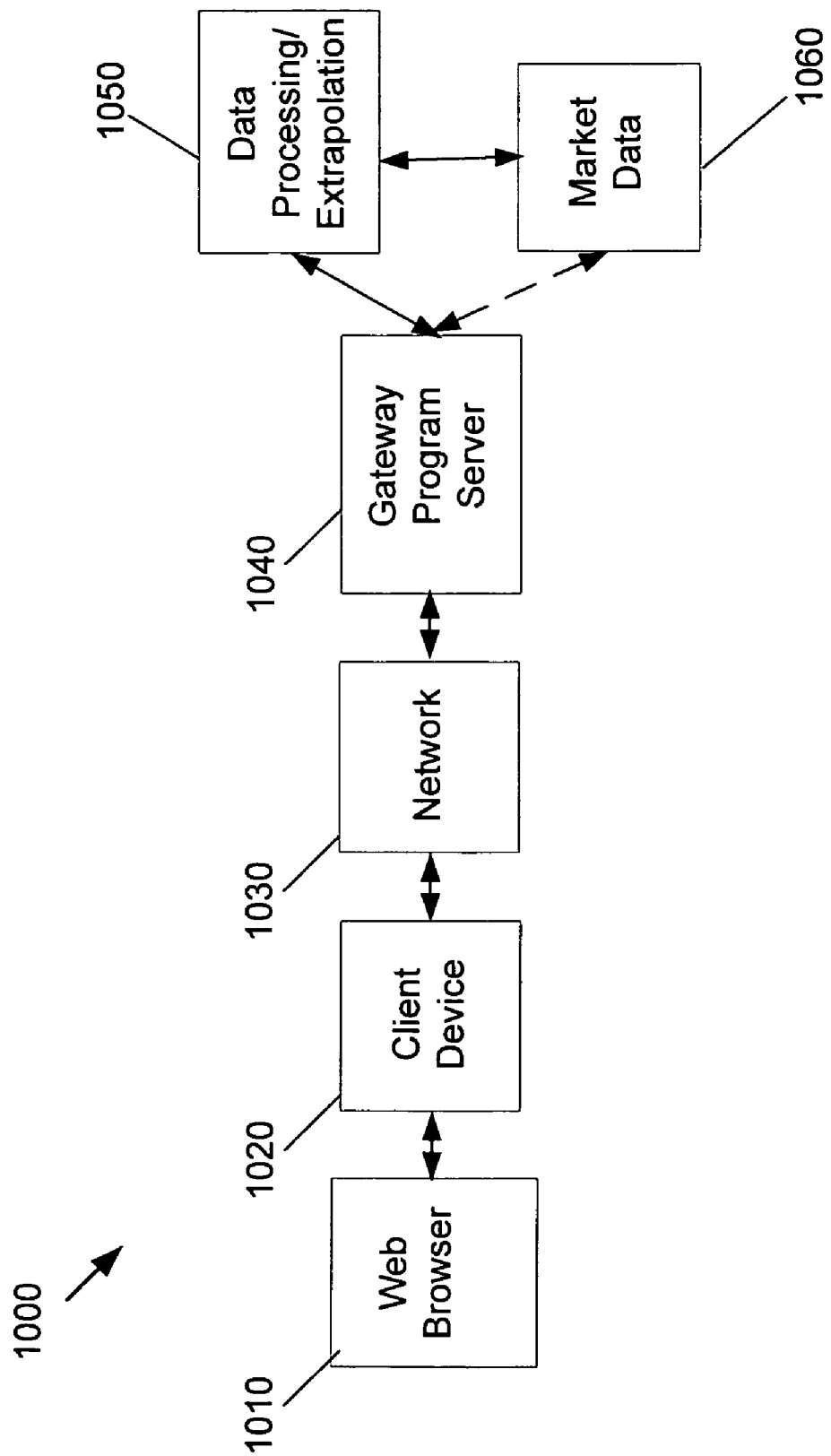
FIG. 10 is a schematic showing an example of the gateway system of the present invention.

FIG. 10 is diagrammatic representation showing an example of an LNG transaction gateway system 1000. The gateway system 1000 includes a transaction gateway program server 1040 that runs the transaction gateway program. The gateway program server 1040 processes, for example, the LNG related market data 1060. The data processing and/or extrapolation of the market data may occur at module 1050. The module 1050 and/or data 1060 may be part of or separate from the server 1040. The market data may include NYMEX Henry Hub derived or ICE NBP derived data, as described above.

A user or customer may access the transaction gateway interface using a web browser 1010 using client device 1020. The client device 1020 may be a computer, a PDA, cell phone, a palm top computer, tablet PC, a mobile device or any other electronic device.

The client device 1020 is coupled to network 1030. The network 1030 is a communications network that includes, for example, a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advance intelligent network (AIN), any suitable digital or analog network, a broadband network such as a cable network, any other suitable national and/or international communications network or any combination thereof.

The network 1030 includes a plurality of switches, communication interfaces, and/or other components that are not shown for convenience. The communications provided using the network 1030 include hard-line, wireless, RF, optical, or any other type of communications or any combination thereof. The various devices, systems, networks, etc. may be appropriately configured or equipped with hardware and/or software to operate in such environments.

A user enters the transaction gateway using a web browser 1010 and client device 1020 to place an offer to purchase an option to sell LNG as described herein.

FIG. 11 is a flowchart illustrating the process for providing the LNG gateway to the user and processing the transaction in accordance with an embodiment. In this embodiment, a user start the process by entering (1110) the LNG gateway system. The system provides (1115) the user with the most current market data, and receives (1120) from the user a selection of "delivery month" for an option to sell LNG. Based on the selected "delivery month," the system populates (1120) the respective market price points in the NYMEX Henry Hub, ICE NBP and Spread fields. The system then receives (1125) the cargo size and discount information from the user, calculates and provides (1130) the spread option value to the user. If the system is notified (1135) that the premium at 100% of the offer percentage is acceptable to the user, the system presents (1150) a summary sheet to the user. After receiving the selected delivery week (1151) and a purchase offer for the option (1153) from the user, the system will present (1154) the purchase offer to the seller of the option and notify (1156) the user whether the purchase offer has been accepted or rejected. As discussed earlier, the seller of the option to sell can be the owner or operator of the system, or another user of the system.

We claim:

1. A computerized method for online trading of options on liquefied natural gas (LNG), comprising:
   providing an interface screen that shows market data and market data analysis for conducting a transaction and allows a user to input various transaction parameters, wherein said market data and market data analysis shown on the interface screen are continuously updated and wherein said transaction parameters comprise a cargo size of the LNG to be sold, a time of delivery, and a discount value, wherein said discount value is the discount that the user is willing to give in order to sell the LNG;
   dynamically receiving, via the interface screen, selected transaction parameters for an option to sell LNG from the user and generating said option on demand;
   calculating, at a server, a spread option value for said option based on the selected transaction parameters including said discount value and the continuously updated market data including NYMEX Henry Hub price, ICE NBP price, and the difference between NYMEX Henry Hub and ICE NBP prices;
   providing, via the interface screen, the dynamically calculated spread option value to the user, wherein said interface screen allows the user to determine an option premium the user is willing to pay for the option by entering an offer percentage and submitting an on-line offer to purchase said option at said option premium, wherein said option premium is the product of said spread option value and said offer percentage;
   receiving said on-line offer for purchasing said option from the user; and
   presenting the received offer to a seller of said option for acceptance or rejection.

2. The method of claim 1, wherein said options on liquefied natural gas (LNG) includes a put option.

3. The method of claim 1, wherein said option premium is calculated based on the selected transaction parameters received from the user, the continuously updated market data, and the analyzed market data.

4. The method of claim 1, further comprising the step of confirming an accepted offer.

5. The method of claim 4, wherein said confirming step confirms the terms and conditions of the option.

6. The method of claim 1, further comprising the step of providing an agreement to be executed by the user.

7. The method of claim 1, wherein said seller is another user.

8. The method of claim 1, wherein said seller is an owner or an operator of a computer program implementing said method.

9. A system for on-line trading of options on LNG, comprising:
   an analyze module that provides continuously updated market information and data analysis to a user;
   a transaction module that receives transaction parameters from the user, calculates and provides an purchasable spread option value for an option on LNG to the user, wherein said option is generated on demand based on the transaction parameters comprising a cargo size of the LNG to be sold, a time of delivery, a discount value, said discount value is the discount that the user is willing to give in order to sell the LNG, and the continuously updated market information, wherein said market information comprises NYMEX Henry Hub price, ICE NBP price and the difference between NYMEX Henry Hub and ICE NBP prices, and wherein said option can be purchased by the user at said spread option value, receives an on-line offer for purchasing the option from the user, wherein said on-line offer can be at an option premium that is lower or higher than said spread option value; and presents said offer to a seller for acceptance or rejection;
   a user interface accessible through a web browser, said user interface shows market information and data analysis generated by the analyze module and receives from a user-various transaction parameters, wherein said user interface comprises a screen that shows (1) market information and market data analysis for conducting a transaction and allows a user to input various transaction parameters, wherein said market information and market data analysis shown on the interface screen are continuously updated, (2) transaction parameters comprising cargo sizes, time of delivery and discount values, wherein said transaction parameters can be changed by the user on said user interface; and (3) said dynamically calculated spread option value, an offer percentage the user is willing to pay based on said spread option value, and said option premium, wherein said offer percentage can be changed by the user on said user interface and wherein said option premium is a product of said spread option value and said offer percentage; and a processor device to execute said modules.

10. The system of claim 9, wherein said market information comprises LNG-related market data.

11. The system of claim 9, wherein said user interface is accessible from a user device coupled to a communications network.

12. The system of claim 11, wherein said user device is selected from the group consisting of desktop and laptop computers, PDAs, cell phones, palm top computers, and tablet personal computers.

13. The system of claim 11, wherein said communications network is selected from the group consisting of a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advance intelligent network (AIN), a digital or analog network, a broadband network, a cable network, and any combination thereof.

14. The system of claim 9, wherein said seller is another user.

15. The system of claim 9, wherein said seller is an owner or an operator of the system.

16. The system of claim 9, wherein said analyze module provides forecasted data based on delayed data or real time data.

17. A computerized method for conducting an optional sale of an LNG cargo at a designated LNG regasification terminal, comprising:

providing an interface screen that shows market data and market data analysis for conducting a transaction and allows a user to input various transaction parameters, wherein said market data and market data analysis shown on the interface screen are continuously updated and wherein said transaction parameters comprise a cargo size of the LNG to be sold, a time of delivery at said LNG regasification terminal, and a discount value, wherein said discount value is the discount that the user is willing to give in order to sell the LNG;

dynamically receiving, via the interface screen, selected transaction parameters for an option on LNG from the user and generating said option on demand;

dynamically calculating, at a server, a spread option value for said option based on the selected transaction parameters including said discount value, and the continuously updated market data, wherein said market information comprises NYMEX Henry Hub price, ICE NBP price, and the difference between NYMEX Henry Hub and ICE NBP prices;

providing, via the interface screen, the dynamically calculated spread option value to the user, wherein said interface screen allows the user to determine an option premium the user is willing to pay for the option and submit an on-line offer to purchase said option at said option premium, wherein said option premium can be lower or higher than said spread option value;

receiving said on-line offer for purchasing said option from the user; and presenting the received offer to a seller of said option for acceptance or rejection.

* * * * *